United States Patent Office.

NICHOLAS JOLY, OF PARIS, FRANCE.

*Letters Patent No. 67,555, dated August 6, 1867.*

IMPROVED MEDICAL COMPOUND.

*The Schedule referred to in these Letters Patent and making part of the same.*

TO ALL WHOM IT MAY CONCERN:

Be it known that I, NICHOLAS JOLY, of Paris, in the Empire of France, have made a new and useful improvement in the preparation of Cod-Liver Oil for alimentary and curative purposes, the same being a new manufacture.

My invention converts cod-liver oil into a proper aliment of food, that is to say, into a substance acceptable to the human stomach and agreeable to the human palate, thus adapting it to a large class who need it, but who have hitherto been unable to use it. The process which I have discovered works no change in the chemical constitution of the oil, and therefore leaves its peculiar virtues intact. Like other oils, cod-liver oil ranks naturally among articles of food, because the human system can appropriate it only through digestion. Now, as attractive food is far more nourishing than unattractive, the first necessity in manipulating cod-liver oil is to deprive it of its repulsiveness. Hippocrates laid down the maxim that food without appetite but half serves its purpose. The use of cod-liver oil, then, in its raw state, is attended with great waste. By my invention this loss is prevented, for, under its new form, it is taken with a positive relish, so that it is a fair supposition to estimate one pound of the cod-liver oil cream as equal to three or four of the naked and disgusting oil. The fattening properties of cod-liver oil are well known, but unfortunately, thus far, but few have been able to avail themselves of it for this purpose. It has been estimated in France that but fifty out of every hundred persons are able to use it, its repulsiveness preventing some from swallowing it, causing others to vomit it up, while a third class suffer, from its use, the pains of a severe indigestion. For these reasons, none attempt its use except the actually desperate, and yet there is a large class who need it besides the really sick. A substance possessing the extraordinary power to fatten which this does could not but prove of incalculable value to many aged and feeble persons, who are debilitated for want of nourishment in proper quantity, if it were of easy digestion, and this improvement in the oil is what my invention has accomplished.

The following is the receipt for making cod-liver oil cream, which I have lodged in the French Academy of Sciences, viz: White cod-liver oil, three thousand five hundred grammes; white sugar, one thousand five hundred; albumen, seven hundred and fifty; alcohol, three hundred; essential oil of bitter almonds, five; and two of peppermint.

My manner of compounding these materials is as follows, viz: Reducing the mucilage and sugar to a sirup of ordinary consistency, I pour it into a mortar while it is warm, and add the oil, little by little, while stirring and beating the mass with a pestle. Then I add the alcohol, and, lastly, the perfume. It is then ready for bottling.

The albumen preferred and used by me, when procurable, is fish albumen. This article, because of its richness in organic phosphorus, has been found eminently serviceable in diseases of the spinal cord and ganglions. In rickets, "Pott's disease," and similar affections, its efficacy is beyond dispute. My manner of preparing the compound is not in the jelly form, as that is not readily dissolvable in cold water, and, moreover, it is liable to spoil after the jar has been once opened. The characteristic of my cream is that it is a cold-water dissolvable paste of unchangeable character, and therefore a practical manufacture of commercial value.

What I claim as my invention, and desire to secure by Letters Patent, is—

The aforesaid albuminous cod-liver oil paste or cream, made by combining cod-liver oil and sugar with albumen, substantially as herein described, when alcohol is incorporated therewith, to conserve it.

I also claim the combination of fish albumen with cod-liver oil, substantially as herein described.

N. JOLY. [L. S.]

Witnesses:
 T. F. KUTTNER,
 EMILE HAND.